Patented Jan. 13, 1942

2,269,516

UNITED STATES PATENT OFFICE 2,269,516

IRON BLUE PIGMENT AND METHOD OF MANUFACTURE

Thomas P. Brown, New York, N. Y., assignor to Interchemical Corporation, New York, N. Y., a corporation of Ohio No Drawing. Application May 22, 1940, Serial No. 336,588

5 Claims. (Cl. 106—304)

This invention relates to iron blue pigments, and has particular reference to an iron blue pigment resistant to the action of alkali. Specifically, this invention relates to iron blue, coated with a film-forming alkali metal bori-phosphate, whereby its resistance to alkali is considerably enhanced.

Iron blue is ordinarily made by precipitating a soluble ferro cyanide with a ferrous salt, and oxidizing the resultant precipitate to ferric ferro cyanide. This blue pigment is widely used in the coating and printing ink fields. One of its principal disadvantages is its unusually poor resistance to alkali. Even very weak alkalis will tend to destroy the color, and convert it into a colorless compound.

I have discovered that iron blues can be made considerably more alkali resistant by treating the pigment with from 1 to 10% of a film-forming alkali metal bori-phosphate; the bori-phosphate appears to form a film on the pigment which retards the action of alkali to a considerable extent.

Best results are obtained by adding the bori-phosphate to an aqueous slurry of the pigment, preferably neutralized with ammonia, and washed to an acid content of 1/125 to 1/500 normality. The bori-phosphate, in such cases, probably forms a film over the blue pigment, and since it is reactive with heavy metal, it may very well react with iron salts adsorbed in the pigment to form a film of the iron salt.

Somewhat better results, both as to alkali fastness and lack of reactivity with acid vehicles, may be obtained by mixing the slurry, after the bori-phosphate is added, with a mineral oil emulsion.

I have tried a variety of other coatings, including alkali resistant organic film-forming agents, but none of these coatings yield any substantial improvement in the alkali-resistance of the iron blue. Even the polyhydric alcohol bori-phosphate resins seem to be ineffectual; the effect seems to be specific to alkali metal film forming bori-phosphates.

Typical examples of my invention are the following:

EXAMPLE 1.—*Green shade blue*

| | Pounds |
|---|---|
| Yellow prussiate of soda | 344 |
| Ammonium sulphate | 72 |

Dissolved together in 1000 gallons of water at boil in 2500 gallon vat with agitator running at 16 R. P. M. Run in rapidly—

| | |
|---|---|
| Copperas, in 120 gallons of water at a boil | 340 |

Boil ½ hour. Add—

| | |
|---|---|
| Sulphuric acid 60° Bé | 168 |

Followed by—

| | |
|---|---|
| Sodium chlorate dissolved in 20 gallons of water | 24 |

Boil 5 minutes. Shut off steam and let stand 14 hours before flooding. Wash by decantation and flooding until supernatant liquor has an acid normality of about 1/125. Add ammonium hydroxide with agitation to a pH of 6.8 to 6.9, and stir 15 minutes. Add—

| | |
|---|---|
| Sodium bori-phosphate, of the type disclosed in Bennett U. S. Patent No. 2,143,641, dissolved in 75 gallons of water at 150° F | 15 |

Stir 15 minutes. Add—

| | |
|---|---|
| Mineral oil } Emulsified in 50 gallons of water. | 12 |
| Sodium salt of sulphonated mineral oil | 3 |

Stir ½ hour. Filter press. Dry at 180° F. Pulverize.

EXAMPLE 2.—*Red shade iron blue*

| | Pounds |
|---|---|
| Yellow prussiate of soda, dissolved in 350 gallons of water at 100° F. in a 2500 gallon vat, equipped with agitator running at 16 R. P. M. | 413 |

Run in rapidly—

| | |
|---|---|
| Copperas, dissolved in 250 gallons of water at 100° F | 356 |

Stir 1 hour. Heat to boil. Boil 1 hour. Add—

| | |
|---|---|
| Ammonium sulphate in 100 gallons of water | 236 |

Boil 15 minutes. Add—

| | |
|---|---|
| Sulphuric acid 60° Bé } in 30 gallons of water | 215 |
| Nitric acid 42° Bé | 2 | followed by—

| | |
|---|---|
| Sodium bichromate in 25 gallons of water | 9½ |

Shut off steam. Stir 1 hour. Wash by flooding and decantation until supernatant liquor has an acid normality of about 1/125. Add—

| | |
|---|---|
| Yellow prussiate of soda in 25 gallons of water at 100° F | 30 |
| Ammonium hydroxide (26° Bé.) in 25 gallons of water | 52 |
| Sodium chlorate in 50 gallons of water at 150° F | 90 |

Stir ½ hour. Add—

| | |
|---|---|
| Sodium bori-phosphate in 75 gallons of water at 150° F | 15 |

Stir 15 minutes. Add—

| | |
|---|---|
| Mineral oil } Emulsified in 50 gallons of water. | 12 |
| Sodium salt of sulphonated mineral oil | 3 |

Stir ½ hour. Filter press. Dry at 180° F. Pulverize.

Examples can be multiplied indefinitely, and various modifications can be made in the typical procedures shown without departing from the scope of my invention, which is set forth in the claims.

I claim:

1. An iron blue of improved alkali resistance, comprising a pigment ferric ferrocyanide containing 1% to 10% by weight of film-forming alkali metal boriphosphate uniformly distributed through the pigment.

2. An iron blue of improved alkali resistance, comprising a pigment ferric ferrocyanide, the individual particles of which carry films of alkali metal boriphosphate comprising 1% to 10% of the pigment by weight.

3. An iron blue of improved alkali resistance, comprising a pigment ferric ferrocyanide, the individual particles of which carry films of alkali metal boriphosphate comprising 1% to 10% of the pigment by weight, and which likewise carry films of mineral oil.

4. The method of improving the alkali resistance of iron blue, which comprises mixing an aqueous suspension of washed iron blue with from 1% to 10% by weight of a film-forming alkali metal boriphosphate, whereby the individual particles of the pigment are coated with films of the boriphosphate.

5. The method of improving the alkali resistance of iron blue, which comprises mixing an aqueous suspension of washed iron blue with from 1% to 10% by weight of a film-forming alkali metal boriphosphate, whereby the individual particles of the pigment are coated with films of the boriphosphate, and thereafter mixing the suspension of pigment with mineral oil, whereby the particles are further coated with films of mineral oil.

THOMAS P. BROWN.